Oct. 14, 1958  B. J. ENGELEN, SR  2,855,986
SACRAL NERVE RELIEVING SEAT CUSHION AND BACK
Filed Dec. 10, 1956
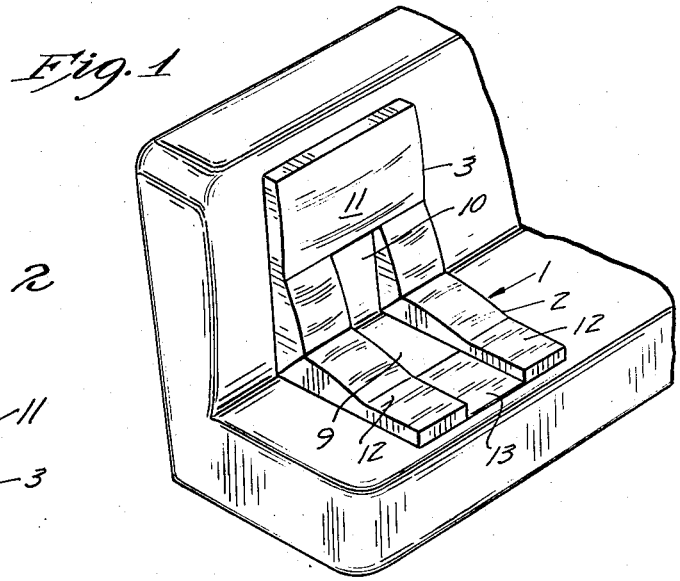
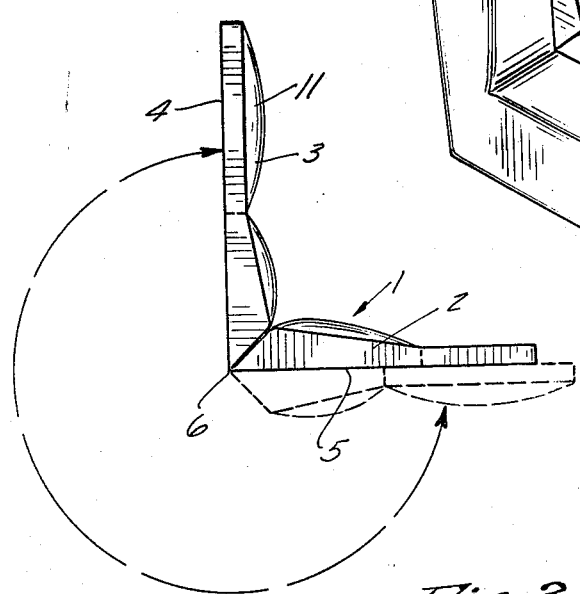
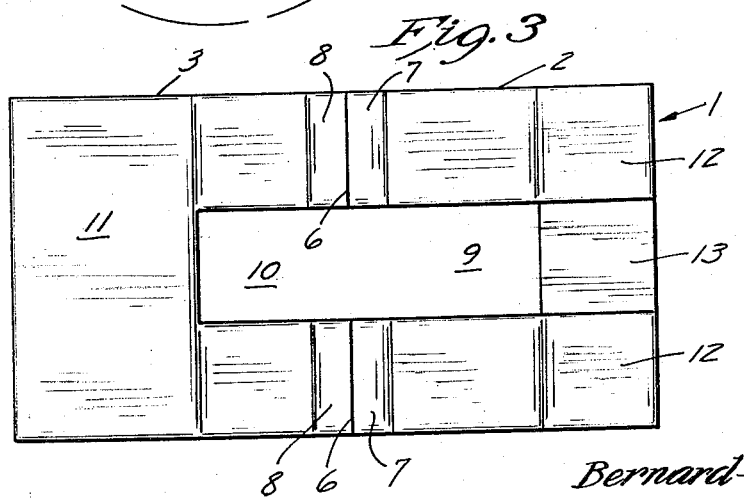
INVENTOR.
Bernard J. Engelen, Sr.
BY
Merchant & Merchant
ATTORNEYS United States Patent Office 2,855,986
Patented Oct. 14, 1958

2,855,986

SACRAL NERVE RELIEVING SEAT CUSHION AND BACK

Bernard J. Engelen, Sr., Springfield, Minn.

Application December 10, 1956, Serial No. 627,176

1 Claim. (Cl. 155—182)

My invention relates generally to seat cushions adapted for use primarily as a supplement to cushions of automotive vehicles. More particularly, my invention relates to improvements in automotive vehicle seat cushions of the type adapted to relieve pressure, strain and irritation to the lower portions of the spine and related areas including the sacral nerves, the prostate, and coccyx.

The principal object of my invention is the provision of an improved seat cushion having certain padded areas and certain relief areas designed to give comfortable support to the body and at the same time relieve pressure from the areas above designated during driving, particularly over long periods.

A further object of my invention is the provision of a novel seat cushion of the type immediately above described which comprises a seat-forming section and a back-supporting section, said sections being so hingedly secured together as to enable same to be folded into compact form in one direction, for shipping and storage.

A further object of my invention is the provision of a cushion of the class immediately above described which is so constructed that when the sections thereof are folded in the opposite direction, engagement of the beveled portions of the sections, immediately adjacent the hinge, limits the back-supporting section against forward swinging movements beyond a substantially upright operative position.

A further object of my invention is the provision of a device of the class above described wherein the seat-forming section is provided with a central longitudinal elongated recess which extends completely therethrough and in which said back-supporting section is provided with a central recess aligned with the recess in the seat-forming section and forming an extension thereof, said last mentioned recess extending only from the lower end portion of said back-supporting section upwardly for substantially one-third the height of said back-forming section, whereby to support the entire upper portion of an occupant's back while relieving the lower portions of the back adjacent the sacral nerve, the prostate, and the coccyx, from engagement or pressure.

A still further object of my invention is the provision of a device of the class above described which can be formed inexpensively from readily available materials, which is light in weight, which may be compactly folded for storage and shipment, and which is highly effective in its use.

The above and still further objects of my invention will become apparent from the following detailed specification, attached drawings, and appended claim.

Referring to the drawings wherein like characters indicate like parts throughout several views:

Fig. 1 is a perspective view of my novel structure in operative position on the seat of an automotive vehicle, Fig. 2 is a view in side elevation thereof, and Fig. 3 is a view in top plan of my novel cushion, with the seat-forming and back-supporting sections thereof lying in a common plane.

Referring with greater particularity to the drawings, the numeral 1 indicates in its entirety my novel cushion comprising a seat-forming section 2 and a back-supporting section 3, the longitudinal dimensions of the latter being at least equal to the longitudinal dimensions of the former so as to give support to the upper as well as to the lower portions of the back of one seated thereon. The sections 2 and 3 may be formed from kapok or other suitable padding such as foam rubber, suitably covered with canvas or other sheeting such as plastic. The back face 4 of the back-supporting panel 3 and the back face 5 of the seat-forming panel 2 are preferably flat as shown, and are hingedly secured together as at 6 by stitching or the like. This arrangement permits the panels 2 and 3 to be folded counterclockwise with respect to Fig. 2 so as to cause the faces 4 and 5 to engage each other, as shown by dotted lines, thereby forming a compact bundle for storage and shipment.

Adjacent the hinge 6, the sections 2 and 3 are beveled as indicated at 7 and 8 respectively to define a miter joint. Consequently, when the back section 3 is in the upstanding position of Fig. 2, the abutting of the beveled edges 7 and 8 limits forward swinging movements of the back-supporting section 3 from its substantially upright operative position of Fig. 2—thus making it unnecessary to utilize straps or other fastening means for this purpose.

As shown particularly in Figs. 1 and 3, the sections 2 and 3 have aligned central recesses 9 and 10 respectively. The recess 9 in the seat-forming section 2 extends longitudinally through same, whereas the recess 10 in the section 3 extends only from the hinge 6 substantially one-third the height thereof, thus providing an uninterrupted upper back-supporting portion 11. Extending between the forwardly projected end portions 12 of the seat-forming section 2, so as to tie same together, is a fabric webbing or the like 13.

While it should be obvious that the dimensions of my novel cushion, above described, would vary in accordance with the particular individual for which it is to be used, I have found that the following dimensions may be used in the making of such a cushion for an average individual, namely—the transverse width of the sections 2 and 3 is 18"; the width of the aligned recesses 9 and 10, 6"; the longitudinal dimension of the seat-forming section 2, 16"; the height of the back-supporting section 3, 18"; and the depth of the beveled portions 7 and 8 of sections 2 and 3 respectively, 2".

My invention has been thoroughly tested and found to be completely satisfactory for the accomplishment of the above objects and while I have shown a preferred embodiment thereof, same may be capable of modification without departure from the scope and spirit of the invention as defined by the appended claim.

What I claim is:

In a device of the class described, a generally rectangular cushion comprising a seat-forming section and an aligned back-supporting section, the longitudinal dimensions of said back-supporting section being at least equal to the longitudinal dimensions of said seat-forming section, means hingedly securing said sections together, said sections having aligned connecting central recesses, the recess in said seat-forming section extending therethrough, and the recess in said back-supporting section extending upwardly from the bottom thereof approximately only one-third of the height thereof, the forwardly projecting ends of said seat-forming section being secured together by a flexible webbing.

References Cited in the file of this patent

UNITED STATES PATENTS

| | | |
|---|---|---|
| 1,468,072 | Ogle | Sept. 18, 1923 |
| 2,204,449 | Gordon | June 11, 1940 |